(12) United States Patent
Ueno et al.

(10) Patent No.: US 6,333,095 B1
(45) Date of Patent: Dec. 25, 2001

(54) FLAME-RETARDANT ADHESIVE FILM AND FLAT CABLE

(75) Inventors: Yoshifumi Ueno; Masayuki Kumakura, both of Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/409,389

(22) Filed: Sep. 30, 1999

(30) Foreign Application Priority Data

Oct. 6, 1998 (JP) .................................................. 10-284533

(51) Int. Cl.$^7$ ........................... B32B 27/06; B32B 27/18; B32B 27/36
(52) U.S. Cl. ................ 428/212; 428/354; 428/355 R; 428/480; 428/920; 428/921; 106/18.11; 106/18.13; 106/18.14; 106/18.21; 106/18.26; 106/18.27; 106/18.3; 106/18.31; 106/18.32; 106/18.36
(58) Field of Search ................................... 428/212, 354, 428/355 R, 920, 921, 480; 523/179; 106/18.11, 18.13, 18.21, 18.26, 18.27, 18.29, 18.31, 18.32, 18.14, 18.36

(56) References Cited

U.S. PATENT DOCUMENTS

| 4,207,374 | 6/1980 | Groff . |
| 5,851,663 | * 12/1998 | Parsons et al. ........................ 428/355 |

FOREIGN PATENT DOCUMENTS

| 775736A2 | 5/1997 | (EP) . |
| A-6-338225 | 12/1994 | (JP) . |
| A-8-60108 | 3/1996 | (JP) . |
| 09221642A | 8/1997 | (JP) . |
| A-9-221642 | 8/1997 | (JP) . |
| WO 95/32257 | 11/1995 | (WO) . |

* cited by examiner

Primary Examiner—Vivian Chen
(74) Attorney, Agent, or Firm—Oliff & Berridge, PLC

(57) ABSTRACT

A flame-retardant adhesive film comprises an insulating substrate film, a flame-retardant interlayer provided on the insulating substrate film, and a flame-retardant adhesive layer provided on the flame-retardant interlayer. The flame-retardant interlayer has higher flame retardance than the flame-retardant adhesive layer. The flame-retardant adhesive layer contains a nitrogen-containing organic flame retardant, and the flame-retardant interlayer contains a non-halogen-based flame retardant with better flame retardance than the nitrogen-containing organic flame retardant.

11 Claims, 1 Drawing Sheet

FLAME-RETARDANT ADHESIVE FILM AND FLAT CABLE

BACKGROUND OF THE INVENTION

1 Field of the Invention

The present invention relates to a flame-retardant adhesive film that can be used favorably in the production of a flat cable, and to a flat cable produced from this film.

2 Description of the Related Art

There are known flat cables with a construction in which a plurality of conductors in a line shape covered with two adhesive films in which an adhesive layer is formed on a substrate film. These flat cables are widely used for the wiring of the AV and computer devices which have recently come to be mounted at such high densities.

From the standpoints of both their electrical applications and fire prevention, the material that makes up a flat cable other than the conductors (that is, the adhesive film composed of a substrate film and an adhesive layer) needs to exhibit good electrical insulation and good flame retardance.

Accordingly, halogen-based flame retardants (such as decabromodiphenyl ether or hexabromodiphenyl ether), as flame retardance auxiliaries inorganic fillers such as silica, clay or the like have been added to the adhesive layer of the adhesive films used in flat cables. However, non-halogen-based flame retardants have recently come to be used in place of halogen-based flame retardants as the flame retardants added to the adhesive layer in an effort to protect our global environment. For instance, Japanese Patent application Laid-Open No.06-338225 discloses that a phosphoric ester or another such a phosphorus-based flame retardant is added as a non-halogen-based flame retardant to the polyester flame-retardant layer of an adhesive tape used for a flat cable. Also, Japanese Patent application Laid-Open No.09-221642 discloses that a thermoplastic polyester resin substrate that makes up an adhesive film used for a flat cable, or an adhesive layer formed over this substrate, is rendered flame-retardant by a phosphorus-based flame retardant.

When flat cables are used for the wiring of various products related to human safety (such as airbags in automobiles or medical equipments), extremely high electrical insulation is required in order to ensure a consistently high level of safety.

A problem with the adhesive tapes or adhesive films disclosed in the above publications, however, is that sufficiently high insulation resistance of the adhesive tape or film cannot be achieved because the phosphorus-based flame retardant itself contained in the adhesive layer has hygroscopic or ionic properties.

One possible way to deal with this problem is to add a nitrogen-containing organic flame retardant that exhibits relatively high insulation performance (such as melamine) to the adhesive layer of a flame-retardant adhesive film, but because the flame retardance of a nitrogen-containing organic flame retardant is insufficient, the resulting flame retardance is not on a par with that of a flame-retardant adhesive film containing a halogen-based flame retardant. Moreover, the necessary adhesive strength cannot be ensured if a large amount of nitrogen-containing organic flame retardant is added to the adhesive layer in order to increase flame retardance. Consequently, nitrogen-containing organic flame retardant are not as yet being used with flame-retardant adhesive films for use in flat cables.

SUMMARY OF THE INVENTION

The present invention is intended to solve these problems of prior art, and an object thereof is to give good electrical insulation, adhesion and flame retardance to a flame-retardant adhesive film that makes use of a non-halogen type of flame retardant.

The inventors perfected the present invention upon discovering that the stated object could be achieved by dividing a flame-retardant layer provided on an insulating substrate film into at least two layers, using a nitrogen-containing organic flame retardant with good electrical characteristics (insulation) to render flame-retardant the flame-retardant layer on the far side from the substrate film (the adhesive layer in contact with the conductors of the flat cable), and using a non-halogen type of flame retardant with better flame retardance than the nitrogen-containing organic flame retardant to render flame-retardant the flame-retardant layer on the substrate film side. In other words, the object of the present invention has been achieved by using non-halogen-based flame retardants in the adhesive layer and the flame-retardant layer and by allowing the flame-retardant layer to have higher flame retardance than the adhesive layer.

Specifically, the present invention provides a flame-retardant adhesive film, comprising an insulating substrate film, a flame-retardant interlayer provided on the insulating substrate film, and a flame-retardant adhesive layer provided on the flame-retardant interlayer, wherein the flame-retardant interlayer has higher flame retardance than the flame-retardant adhesive layer. In the present invention, it is preferred that the flame-retardant adhesive layer contains a nitrogen-containing organic flame retardant, and the flame-retardant interlayer contains a non-halogen-based flame retardant with better flame retardance than the nitrogen-containing organic flame retardant.

The present invention further provides a flat cable wherein a conductor is covered with this flame-retardant adhesive film.

This and other objects, features and advantages of the present invention are described in or will become apparent from the following detailed description of the invention.

DESCRIPTION OF THE PREFERRED EMBODIMENTS

Figure 1:
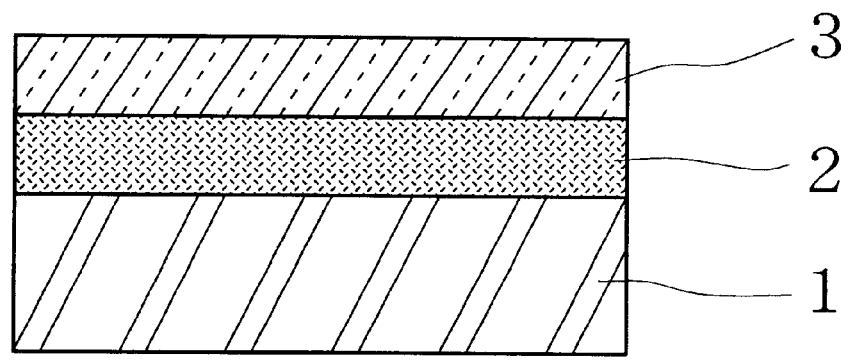
FIG. 1 is a cross section of the flame-retardant adhesive film of the present invention.

The present invention is described hereinbelow in detail.

The flame-retardant adhesive film of the present invention, as shown in FIG. 1, has a construction in which at least a flame-retardant interlayer 2 is provided on an insulating substrate film 1, and a flame-retardant adhesive layer 3 is provided on this flame-retardant interlayer 2. Here, the flame-retardant adhesive layer 3 is rendered flame-retardant by a nitrogen-containing organic flame retardant, and is structured such that the nitrogen-containing organic flame retardant is dispersed in the base resin used for the adhesive layer. Meanwhile, the flame-retardant interlayer 2 is rendered flame-retardant by a non-halogen-based flame retardant that has better flame retardance than the nitrogen-containing organic flame retardant, and is structured such that the non-halogen-based flame retardant is dispersed in the base resin for the interlayer. As the result, the flame-retardant interlayer has higher flame retardance than the flame-retardant adhesive layer.

Therefore, the flame-retardant adhesive film of the present invention obtains good insulating properties due to the flame-retardant adhesive layer 3, and obtains a good flame retardance due to the flame-retardant interlayer 2.

A compound that does not contain any halogen atoms and that exhibits high insulation resistance when this compound is contained in a flame-retardant adhesive agent is used as the nitrogen-containing organic flame retardant added to the flame-retardant adhesive layer 3. Favorable examples of this nitrogen-containing organic flame retardant include melamine (cyanuric triamide), ammeline (cyanuric diamide), ammelide (cyanuric monoamide), melam (supposed to be [3,5-$(NH_2)C_3N_3$]NH), melamine cyanurate (a condensate of melamine and cyanuric acid), a melamine resin, melamine derivatives such as homoguanamine, benzoguanamine or acectoguanamine. Of these, the use of melamine cyanurate is preferred because of its dispersibility and miscibility in the resin, its adhesive properties, and so on.

Sufficient flame retardance will not be obtained if the nitrogen-containing organic flame retardant is used in too small an amount, but the adhesive strength will be insufficient if this amount is too large, so a preferable amount is 50 to 150 weight parts, and more preferably 50 to 100 weight parts, per 100 weight parts of the base resin used for the adhesive layer.

A variety of thermoplastic resins can be used as the base resin used for the flame-retardant adhesive layer 3, but the use of a polyester resin is preferred. The reason why a polyester resin is preferable is that it is relatively less hygroscopic than the polyamide resins and the like generally used as adhesive components, and furthermore it poses no practical problems in terms of film strength, and its electrical insulation properties are excellent.

Examples of this polyester resin include polyester resins formed from an acid component (such as terephthalic acid, isophthalic acid, diphenyldicarboxylic acid, adipic acid, sebacic acid, polyvalent carboxylic acids having phosphoric acid residues in their molecules, glutaric acid, trimellitic acid, and sodium sulfoisophthalate) and a dialcohol component (such as ethylene glycol, 1,4-butanediol, 1,4-dicyclohexanedimethanol, 1,4-cyclohexanedimethylol, diethylene glycol, and an ethylene oxide-added trimethylolpropanol of bisphenol A). Of these, a phosphorus-introduced polyester resin having phosphoric acid residues in its molecules (Japanese Patent Application Laid-Open No.08-60108) is preferable because of its higher flame retardance.

From the standpoint of ensuring good film formation even when the nitrogen-containing organic flame retardant is contained in a large amount, the number average molecular weight of the polyester resin is preferably between 3,000 and 100,000, and more preferably between 10,000 and 50,000.

The glass transition point of the polyester resin is preferably 0 to 100° C., and more preferably from 0 to 70° C., so that good thermal adhesion to conductors such as copper will be achieved when the flame-retardant adhesive film is applied to the production of a flat cable.

A common flame retardance auxiliary (such as manganese borate, zinc borate, ammonium borate, lead borate, aluminum hydroxide, or magnesium hydroxide) can be added to the flame-retardant adhesive layer 3.

The addition of this flame retardance auxiliary will have no effect if the amount used in the flame-retardant adhesive layer 3 is too small, but adhesion will decrease if the amount is too large, so the amount is preferably 5 to 150 weight parts, and more preferably 10 to 100 weight parts, per combined 100 weight parts of the adhesive layer base resin and the nitrogen-containing organic flame retardant.

To the extent that the effect of the present invention is not lost, the flame-retardant adhesive layer 3 can also contain various additives as needed, such as organic solvents, antioxidants, metal corrosion inhibitors, colorants (pigments and dyes), various types of coupling agents for increasing the cohesive strength between the adhesive component resin and the flame retardant, crosslinking agents, crosslinking auxiliaries, fillers, anti-static agents, and flame retardance catalysts.

The thickness of the flame-retardant adhesive layer 3 will vary with the intended use of the flame-retardant adhesive film and other factors, but is usually 10 to 100 μm.

As mentioned above, the non-halogen-based flame retardant added to the flame-retardant interlayer 2 is a compound whose flame retardance is better than that of the nitrogen-containing organic flame retardant added to the flame-retardant adhesive layer 3. An example of this non-halogen-based flame retardant is ammonium polyphosphate, which has good dispersibility and miscibility in the base resin.

The non-halogen-based flame retardant will have no flame retardance effect if the amount used in the flame-retardant interlayer 2 is too small, but layer separation will tend to occur if the amount is too large, so the amount is preferably 50 to 200 weight parts, and more preferably 50 to 150 weight parts, per 100 weight parts of base resin used for the flame-retardant interlayer.

The same resins that can be used as the base resin for the flame-retardant adhesive layer 3 can also be used as the base resin used for the flame-retardant interlayer 2. Of these, the use of the above-mentioned polyester resins is preferred.

The thickness of the flame-retardant interlayer 2 will vary with the intended use of the flame-retardant adhesive film and other factors, but is usually 10 to 100 μm.

To the extent that the effect of the present invention is not lost, the flame-retardant interlayer 2 can also contain various additives as needed, such as flame retardance auxiliaries, organic solvents, antioxidants, metal corrosion inhibitors, colorants (pigments and dyes), various types of coupling agents for increasing the cohesive strength between the adhesive component resin and the flame retardant, crosslinking agents, crosslinking auxiliaries, fillers, anti-static agents, and flame retardance catalysts.

Examples of the insulating substrate film 1 include a polyethylene terephthalate film, polyethylene naphthalate film, polyimide film, polyphenylene sulfide film, polypropylene oxide film, polyethylene film, polypropylene film, and polyamide film. The thickness thereof can be suitably selected according to the intended use, but ranges from a few microns to a few hundred microns, for example.

A primer layer can be provided between the insulating substrate film 1 and the flame-retardant interlayer 2 or between the flame-retardant interlayer 2 and the flame-retardant adhesive layer 3. Another flame-retardant interlayer can also be provided between the flame-retardant interlayer 2 and the flame-retardant adhesive layer 3.

The flame-retardant adhesive film of the present invention can be manufactured by a known method. For example, it can be manufactured by dissolving the interlayer base resin and the non-halogen-based flame retardant in an organic solvent (such as toluene), using the flame-retardant interlayer composition thus obtained to coat the insulating substrate film 1, and drying this coating to form the flame-retardant interlayer 2, and then dissolving the adhesive layer base resin and the nitrogen-containing organic flame retardant in an organic solvent, using the flame-retardant adhesive layer composition thus obtained to coat the flame-retardant interlayer 2, and drying this coating to form the flame-retardant adhesive layer 3.

The flame-retardant adhesive film of the present invention can be applied as a surface protecting film for a variety of circuits, but can be used to particularly good advantage in the production of a flat cable. For example, a flat cable can be produced by arranging a plurality of conductors in parallel, then laminating flame-retardant adhesive films from above and below the conductors. This flat cable produced using the flame-retardant adhesive film of the present invention is covered with flame-retardant adhesive films having good flame retardance, insulation, and adhesion, whereby obtained is a flat cable with good flame retardance, electrical reliability, and peel strength. Furthermore, since this flat cable contains no halogens, it is also favorable in terms of the global environment.

If, in the production of a flat cable, the adhesive strength of the flame-retardant adhesive films is insufficient at normal temperature due to the presence of the flame retardant, it is preferable to employ a hot lamination method featuring the use of a roll heated to between 80 and 200° C. when the conductors are laminated.

EXAMPLES

The present invention will now be described in specific terms through working examples.

Working Examples 1 and 2 and Comparative Examples 1 to 4

(Preparation of a composition for forming a flame retardant adhesive layer)

100 weight parts of a polyester resin (trade name: Elitel Series, made by Unitika Co, Ltd.) was dissolved in a mixed solvent composed of 75 weight parts of methyl ethyl ketone and 300 weight parts of toluene. To this solution were added 50 weight parts of melamine cyanurate and 50 weight parts of zinc borate, and this system was mixed under agitation to prepare a liquid composition for forming a flame-retardant adhesive layer.

(Preparation of a composition for forming a flame-retardant interlayer)

100 weight parts of a polyester resin (trade name: Elitel Series, made by Unitika Co.Ltd.) was dissolved in a mixed solvent composed of 75 weight parts of methyl ethyl ketone and 300 weight parts of toluene. To this solution was added 50 weight parts of ammonium polyphosphate, and this system was mixed under agitation to prepare a liquid composition for forming a flame-retardant interlayer.

(Production of a flame-retardant adhesive film)

The composition for forming a flame-retardant interlayer was coated using a bar coater on a polyester film with a thickness of 25 μm (made by Unitika Co.Ltd.), such that the dry thickness would be as shown in Table 1. This product was put in a drying furnace to volatilize the methyl ethyl ketone and toluene and form a flame-retardant interlayer.

The composition for forming a flame-retardant adhesive layer was coated using a bar coater on the flame-retardant interlayer with such that the dry thickness would be as shown in Table 1. This product was put in a drying furnace to volatilize the methyl ethyl ketone and toluene and form a flame-retardant adhesive layer. This yielded a flame-retardant adhesive film (Working Examples 1 and 2).

In Comparative Example 1, no flame-retardant adhesive layer was provided, and the thickness of the flame-retardant interlayer was changed to 45 μm. In this case, the flame-retardant interlayer also functions as the adhesive layer. In Comparative Example 2, no flame-retardant interlayer was provided, and the thickness of the flame-retardant adhesive layer was changed to 45 μm. In Comparative Example 3, 50 weight parts of ammonium polyphosphate was further added to the composition for forming a flame-retardant adhesive layer, and a flame-retardant adhesive film was produced by using the resulting composition for forming a flame-retardant adhesive layer, not providing a flame-retardant interlayer, and providing a flame-retardant adhesive layer in a thickness of 45 μm.

In Comparative Example 4, a flame-retardant adhesive film was produced using a halogen-based flame retardant.

(Production of a flat cable)

The flame-retardant adhesive film thus obtained was cut to the specified length, and two of these were readied. A plurality of flat-type conductors (flat-type copper wires plated with tin) with a wire thickness of 50 μm were laid out in parallel on one of the flame-retardant adhesive films, over which was placed the other flame-retardant adhesive film, after which this assembly was passed between two rolls heated to 150° C. to bond the films together and produce a flat cable.

(Evaluation)

The flame-retardant adhesive agents of Working Examples 1 and 2 and Comparative Examples 1 to 4 were evaluated for "insulation resistance," "flame retardance," and "adhesion" as described below. The results thus obtained are given in Table 1.

Insulation resistance (i) The insulation resistance (applied voltage: 0.5 kV) between adjacent conductors (conductor length: 100 mm) of the flat cable was measured. An insulation resistance of $10^{11}\Omega$ or higher was indicated by the symbol "○," while an insulation resistance of less than $10^{11}\Omega$ was indicated by the symbol "x."

(ii) As a practical test, the flat cable was left for 168 hours in an environment of 40° C. and 90% RH, and the insulation resistance (applied voltage: 0.5 kV) between adjacent conductors (conductor length: 100 mm) of the flat cable was measured. An insulation resistance of $10^{9}\Omega$ or higher was indicated by the symbol "○," while an insulation resistance of less than $10^{9}\Omega$ was indicated by the symbol "x."

Flame retardance

A flame retardance test was conducted by the method set forth in UL-SUB758-VW1. Here, the symbol "⊚" is used to indicate that flame retardance was the same as when a halogen-based flame retardant was used (Comparative Example 4). The symbol "○" indicates that flame retardance was inferior to that when a halogen-based flame retardant was used (Comparative Example 4), but no practical problems were encountered. The symbol "x" indicates that flame retardance was clearly inferior to that when a halogen-based flame retardant was used (Comparative Example 4), to the extent that practical problems were encountered.

Adhesion

The portion where the two flame-retardant adhesive films were bonded together, and the portion where the conductors and the flame-retardant adhesive films were bonded together were cut out and left for one week in a 60° C. thermostatic chamber, after which the adhesive strength of each was measured by Tensilon (made by Orientech). Here, the symbol "○" indicates that the adhesive strength between the adhesive films and between the conductors and the adhesive films was found to be high (0.5 kg/cm or higher), while the symbol "x" indicates less than 0.5 kg/cm.

TABLE 1

|  | Working Ex. | | Comparative Example | | | |
| --- | --- | --- | --- | --- | --- | --- |
|  | 1 | 2 | 1 | 2 | 3 | 4 |
| Flame-retardant adhesive layer thickness (μm) | 30 | 15 | 0 | 45 | 45 | 45 |
| Flame-retardant interlayer thickness (μm) | 15 | 30 | 45 | 0 | 0 | 0 |
| Flame retardance | ⊚ | ⊚ | ⊚ | ○ | ○ | ⊚ |
| Insulation resistance |  |  |  |  |  |  |
| (i)/Ω | ○/$10^{14}$ | ○/$10^{14}$ | ○/$10^{12}$ | ○/$10^{14}$ | ○/$10^{12}$ | ○/$10^{14}$ |
| (ii)/Ω | ○/$10^{9}$ | ○/$10^{9}$ | x/$10^{8}$> | ○/$10^{12}$ | x/$10^{8}$> | ○/$10^{12}$ |
| Adhesion | ○ | ○ | x | ○ | ○ | ○ |

Results

As is clear from Table 1, the flame-retardant adhesive films of Working Examples 1 and 2 exhibited better results for both flame retardance and adhesive strength, and had higher insulation resistance.

On the other hand, in Comparative Example 1, since a flame-retardant interlayer that had been rendered flame-retardant by ammonium polyphosphate functioned as an adhesive layer, the results for insulation resistance (ii) were unsatisfactory. In Comparative Example 2, in which no flame-retardant interlayer was provided, the flame retardance was inferior to that of a halogen-based flame retardant.

In Comparative Example 3, in which the flame-retardant layer was not divided in two, and a single adhesive layer was rendered flame-retardant by melamine cyanurate and ammonium polyphosphate, the results for insulation resistance (ii) were unsatisfactory.

The present invention allows good electrical insulation properties, adhesion, and flame retardance to be realized with a flame-retardant adhesive film in which a non-halogen type of flame retardant is used.

What is claimed is:

1. A flame-retardant adhesive film comprising:

an insulating substrate film;

a flame retardant interlayer provided on said insulating substrate film; and a flame retardant adhesive layer provided on said flame retardant interlayer, wherein said flame-retardant interlayer has higher flame-retardance than said flame-retardant adhesive layer and wherein said flame-retardant adhesive layer contains a nitrogen-containing organic flame retardant and the flame-retardant interlayer contains a non-halogen based flame retardant with better flame retardance than the nitrogen-containing organic flame retardant.

2. The flame-retardant adhesive film according to claim 1, wherein the flame-retardant interlayer has a structure in which the nitrogen-containing organic flame retardant is dispersed in a polyester resin.

3. The flame-retardant adhesive film according to claim 1, wherein the nitrogen-containing organic flame retardant is at least one selected from the group consisting of melamine, ammeline, ammelide, melam, melamine cyanurate, a melamine resin and melamine derivatives.

4. The flame-retardant adhesive film according to claim 3, wherein the nitrogen-containing organic flame retardant is melamine cyanurate.

5. The flame-retardant adhesive film according to claim 1, wherein the nitrogen-containing organic flame retardant is contained in the flame-retardant adhesive layer in an amount of 50 to 150 weight parts per 100 weight parts of base resin used for the flame-retardant adhesive layer.

6. the flame-retardant adhesive film according to claim 1, wherein the flame-retardant adhesive layer further contains a flame retardance auxiliary.

7. The flame-retardant adhesive film according to claim 6, wherein the flame retardance auxiliary is zinc borate, manganese borate, aluminum hydroxide or magnesium hydroxide.

8. The flame-retardant adhesive film according to claim 1, wherein the flame-retardant interlayer has a structure in which the non-halogen-based flame retardant is dispersed in a polyester resin.

9. The flame-retardant adhesive film according to claim 1, wherein the non-halogen-based flame retardant is ammonium polyphosphate.

10. The flame-retardant adhesive film according to claim 1, wherein the non-halogen-based flame retardant is contained in the flame-retardant interlayer in an amount of 50 to 200 weight parts per 100 weight parts of the base resin used for the flame-retardant interlayer.

11. A flat cable, comprising a conductor and a flame retardant adhesive film according to claim 1 with which the conductor is covered.

* * * * *